United States Patent
Metten et al.

(10) Patent No.: US 9,458,868 B2
(45) Date of Patent: Oct. 4, 2016

(54) PLUG-IN COUPLING AND METHOD FOR THE PRODUCTION THEREOF

(75) Inventors: Andreas Metten, Versmold (DE); Jasmin Fritzsch, Halle (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 308 days.

(21) Appl. No.: 14/126,781

(22) PCT Filed: Jul. 20, 2012

(86) PCT No.: PCT/EP2012/064310
§ 371 (c)(1),
(2), (4) Date: Mar. 5, 2014

(87) PCT Pub. No.: WO2013/014085
PCT Pub. Date: Jan. 31, 2013

(65) Prior Publication Data
US 2014/0199116 A1 Jul. 17, 2014

(30) Foreign Application Priority Data
Jul. 27, 2011 (DE) .................. 10 2011 052 190

(51) Int. Cl.
*F16B 5/06* (2006.01)
*B29C 45/16* (2006.01)
*F16B 21/07* (2006.01)

(52) U.S. Cl.
CPC .............. *F16B 5/0621* (2013.01); *B29C 45/16* (2013.01); *F16B 5/065* (2013.01); *F16B 21/073* (2013.01); *F16B 21/078* (2013.01); *B29C 45/1676* (2013.01); *Y10T 403/7039* (2015.01)

(58) Field of Classification Search
CPC ...... F16B 21/06; F16B 21/07; F16B 21/073; F16B 21/075; F16B 21/186; F16B 19/1081; F16B 5/065; F16B 5/0657; F16B 5/0642; B60R 13/04; B60R 13/08; B60R 13/0206
See application file for complete search history.

(56) References Cited

U.S. PATENT DOCUMENTS

| 4,176,428 A | 12/1979 | Kimura |
| 4,183,204 A * | 1/1980 | Sauter .................... G04B 37/00 368/236 |

(Continued)

FOREIGN PATENT DOCUMENTS

| DE | 19526934 A1 | 1/1997 |
| DE | 20117323 U1 | 1/2002 |

(Continued)

OTHER PUBLICATIONS

English translation of the International Preliminary Report on Patentability for PCT/EP2012/064310 dated Feb. 6, 2014, 7 pages.

(Continued)

*Primary Examiner* — Daniel Wiley
(74) *Attorney, Agent, or Firm* — Reising Ethington P.C.

(57) ABSTRACT

The plug-in coupling comprises a negative coupling part and a positive coupling part that includes a pin having a ball head. The negative coupling part comprises a coupling construction made of a first material for accommodating and detachably fastening the positive coupling part, and a retaining construction made of a second material, which surrounds the coupling construction, for fastening the negative coupling part to the second component, wherein the second material has a higher elasticity than the first material.

13 Claims, 6 Drawing Sheets

(56) References Cited

U.S. PATENT DOCUMENTS

| | | | | |
|---|---|---|---|---|
| 4,522,378 A | * | 6/1985 | Nelson | F16B 5/0258 16/2.1 |
| 4,664,574 A | * | 5/1987 | Kasai | A44B 13/007 411/508 |
| 4,668,145 A | * | 5/1987 | Hirohata | F16B 5/065 411/45 |
| 4,716,633 A | | 1/1988 | Rizo | |
| 4,904,107 A | | 2/1990 | Fukukawa et al. | |
| 5,217,337 A | | 6/1993 | Junemann et al. | |
| 5,409,302 A | | 4/1995 | Chabbert | |
| 5,580,204 A | | 12/1996 | Hultman | |
| 5,876,024 A | * | 3/1999 | Hain | B64C 1/18 244/119 |
| 6,206,604 B1 | | 3/2001 | Dembowsky | |
| 6,276,652 B1 | | 8/2001 | Rieger | |
| 7,226,233 B2 | | 6/2007 | SuBenbach et al. | |
| 7,281,303 B2 | | 10/2007 | Terrill et al. | |
| 7,322,768 B2 | * | 1/2008 | Ochiai | F16B 21/073 403/122 |
| 7,828,372 B2 | * | 11/2010 | Ellison | B60R 13/04 24/297 |
| 7,862,274 B2 | * | 1/2011 | Limpert | B60R 13/0206 24/297 |
| 8,776,326 B2 | * | 7/2014 | Clarke | B60R 13/0206 24/297 |
| 8,834,058 B2 | * | 9/2014 | Woicke | B01J 19/32 24/662 |
| 2007/0031185 A1 | | 2/2007 | Bertram et al. | |
| 2013/0031756 A1 | * | 2/2013 | Yuen | F16B 5/0642 24/702 |

FOREIGN PATENT DOCUMENTS

| | | | | |
|---|---|---|---|---|
| DE | 20315778 U1 | | 12/2003 | |
| DE | 10351975 A1 | | 6/2004 | |
| DE | 102007041537 A1 | | 3/2009 | |
| EP | 0902198 A2 | | 3/1999 | |
| EP | 1348876 A1 | | 10/2003 | |
| EP | 1746294 A1 | | 1/2007 | |
| EP | 1906032 A1 | | 4/2008 | |
| FR | EP 1813826 A1 | * | 8/2007 | ............ F16B 21/075 |
| FR | 2901584 A1 | * | 11/2007 | ............ F16B 21/075 |
| FR | 2906322 A1 | | 3/2008 | |
| JP | H06185507 | | 7/1994 | |

OTHER PUBLICATIONS

CN Office Action for CN Application No. 201280029401.9 dated Jan. 7, 2015 (10 pages).

Written Opinion & International Search Report for PCT/EP2012/064310 dated Oct. 19, 2012, 9 pages.

* cited by examiner

Fig. 8

PLUG-IN COUPLING AND METHOD FOR THE PRODUCTION THEREOF

FIELD OF THE INVENTION

The present invention relates to a plug-in coupling comprising a negative and positive coupling part, in particular a ball socket as a negative coupling part in combination with a ball pin as a positive coupling part. The present invention further relates to a production method for the negative coupling part of the plug-in coupling.

BACKGROUND OF THE INVENTION

Different plug-in couplings are known from the prior art, and are described for example in the documents U.S. Pat. No. 5,580,204, EP 0 902 198 B1, EP 1 746 294 A1, DE 201 17 323 U1, U.S. Pat. Nos. 5,409,302 and 4,904,107.

U.S. Pat. No. 5,580,204 describes a negative coupling part, in particular a ball socket which is produced from plastic. This ball socket has on the outside thereof a circumferential recess and a projecting retaining ring so that the inner wall of an opening of a component can snap into the circumferential recess. In this manner, the ball socket, as a one-piece component made of plastic, is fastened in the opening of a paneling part in vehicle manufacturing. A pin having a ball head, which is fastened for example on a retaining structure in the bodywork, snaps into this ball socket.

The document EP 0 902 198 B1 also describes a negative coupling part for accommodating a pin having a ball head which is produced from a plastic. The construction of the negative coupling part is designed such that a retaining ring extends around the ball socket so that a spacing is present between the retaining ring and ball socket for dampening vibrations. This retaining ring is fastened on a conically shaped lead-in region of the negative coupling part.

The known plug-in couplings have the disadvantage that due to the material selection of the plug-in coupling, and due to the construction thereof, a compromise must be made in order to implement an optimal fastening of the ball pin within the negative coupling part and of the coupling part to a component, and a satisfactory damping of vibrations between the negative and positive coupling part. This compromise has frequently led to the consequence that both functions are not optimally implemented in the plug-in coupling.

Therefore, of the present invention may provide a plug-in coupling with which, in comparison to the prior art, an improved fastening function can be implemented between the negative and positive coupling part and an improved vibration decoupling can be implemented between the negative and positive coupling part. An appropriate production method for the plug-in coupling is also disclosed.

SUMMARY OF THE INVENTION

A negative coupling part is set forth in the independent claim 1 and a plug-in coupling according to the independent claim 11. A production method for producing the negative coupling part results from the independent claim 12. Advantageous embodiments of the present invention and further developments and modifications result from the dependent claims and the description with the accompanying drawings.

At least some embodiments of the present invention comprise a negative coupling part for a plug-in coupling with which a first and a second component can be detachably connectable to each other, wherein the negative coupling part has the following features: a coupling construction made of a first material for accommodating and detachably fastening a positive coupling part, and a retaining construction made of a second material, which surrounds the coupling construction, for fastening the negative coupling part to the second component, wherein the second material has a higher elasticity than the first material, such that component vibrations can be absorbed by the retaining construction.

The construction of the negative coupling part of the plug-in coupling may be based on the use of two materials of different elasticity for producing the negative coupling part. A material of lower elasticity and higher stability is used for producing the coupling construction in that the positive coupling part, for example a pin having a ball head, is accommodated and fastened. The low elasticity compared to the second material, and the high stability of the first material ensure that the pin having a ball head, thus the positive coupling part, is held reliably in the coupling construction. In order to be able to dampen possible vibrations between the first and the second component, and thus between the negative and the positive coupling part, the coupling construction is fastened to the second component via a retaining construction made of a second material. The material of the retaining construction has a higher elasticity, in comparison to the first material of the coupling construction, so that component vibrations from the first and second component can be damped and/or noises can be decoupled between components. The second material is thus more elastically deformable than the first material so that despite a reliably implemented fastening of the negative coupling part in the second component, a certain flexibility of the negative coupling part relative to the second component is guaranteed. This flexibility ensures along with a decoupling of vibrations also a tolerance compensation with the fastening of the first component to the second component via the plug-in coupling according to the invention. Because the coupling construction can be moved within a certain tolerance range in the lateral and axial direction via the elasticity of the second material of the retaining construction, misalignments between the first and second component or between the negative coupling part and the positive coupling part, can be compensated so that despite these misalignments an optimal connection can be implemented between the first and second component via the tolerance compensation of the negative coupling part.

The coupling construction of the negative coupling part may comprise at least two spring arms running in the axial direction of the coupling construction that are connected to each other at a first end via a circumferential retaining structure. Additionally, the coupling construction preferably consists of a metal, thermoplastic resin or a thermoplastic elastomer, which has a lower elasticity than the second material of the retaining construction.

By means of the construction of the coupling construction, in particular the at least two spring arms running in the axial direction of the coupling construction, despite the lower elasticity of the first material compared to the second material, a resilient connecting is ensured between the coupling construction and positive coupling part. The pin having a ball head, which serves for example as a positive coupling part, can in this manner snap in between the at least two spring arms, which form a ball socket due to their progression. This snapping in can thereby be varied in the strength thereof in that two, three, four or five spring arms form the ball socket or a similar latching structure of the coupling construction. In order to stabilize the spring arms within the coupling construction, they are connected together at the first end thereof via the circumferential retaining structure. A further stabilization of the coupling construction can be realized in that the spring arms are preferably connected together also at the second end thereof.

According to a further embodiment of the present invention, the retaining construction of the negative coupling part is formed by a ring that is fastened to and surrounding the coupling construction, and that can be fastened in an opening of the second component. This ring may comprise a circumferential radial recess opening outward in the radial direction into which an inside of the opening of the second component can be received. According to a further embodiment, the ring, or respectively the retaining construction, comprises an axial recess open in the axial direction of the retaining construction and circumferential about the retaining construction, such that deformations of the retaining construction can be accommodated in the radial direction.

The circumferential and annular retaining construction consists of the second material that has a higher elasticity compared to the first material of the coupling construction. This ensures that the retaining construction can absorb and dampen vibrations of the components and noises. Additionally, the higher elasticity of the second material guarantees tolerance compensation between the negative and positive coupling part that is described in more detail in the following. Along with the material properties of the second material, the fastening and damping function of the negative coupling part is supported by the design of the retaining construction. For this purpose, the ring of the retaining construction has a circumferential radial recess into which the inner wall of the opening of the first component can be fastened, in particular snapped in. In addition, a recess, preferably circumferential and open in the axial direction, serves as tolerance compensation between the negative coupling part and the positive coupling part, because due to this construction, the negative coupling part can be disposed movable in the radial and axial direction. This tolerance compensation due to the axial recess is matched optimally to the connection to be attained, preferably constructively due to the reinforcing webs bridging the axial recess. These bridging reinforcing webs are preferably disposed at regular distances within the axial recess. Additionally, the number of bridging reinforcing webs varies depending on the desired stability of the circumferential retaining construction.

The retaining construction of the negative coupling part preferably may include a thermoplastic resin or a thermoplastic elastomer of higher elasticity than the first material of the coupling construction.

The present invention may also comprise a plug-in coupling with which the first component and the second component can be detachably connected to each other, and which has the following features: a positive coupling part in connection with the first component, which can be detachably received and latched in a negative coupling part, according to the above description, in connection to the second component. In at least one embodiment, the plug-in coupling according to the invention comprises a pin having a ball head as a positive coupling part and a coupling construction having a ball socket for accommodating the ball head, wherein the coupling construction is connected to a circumferential ring as a retaining construction which has a radial recess for fastening the negative coupling part on the second component and an axial recess for the compensation of vibrations and/or noises and tolerances.

The present invention also discloses a production method for the above described negative coupling part consisting of two materials of different elasticity having the following steps: providing a coupling construction made of a first material and injection-molding around the coupling construction thereby generating a retaining construction made of a second material, wherein the second material has a higher elasticity than the first material.

In at least one embodiment of this production method, an injection molding of the coupling construction made of a thermoplastic resin or a thermoplastic elastomer occurs, as well as the insert molding or injection-molding around the retaining construction made of a more elastic thermoplastic resin or elastomer, compared to the coupling construction. It is also possible to produce the coupling construction from metal, and then, in the present production method, to insert mold to the retaining construction, i.e. injection molding around the retaining construction. With the production of the retaining construction, a recess is created preferably open in the axial direction of the retaining construction and axially circumferential about the retaining construction, and/or a circumferential recess is created preferably radially opened outward in the radial direction. These serve the above already described fastening and/or vibration decoupling and/or the tolerance compensation between the negative and positive coupling part of the plug-in coupling.

DESCRIPTION OF THE ACCOMPANYING DRAWINGS

The presently preferred embodiments of the present invention are explained in greater detail in reference to the accompanying drawing. The figures show.

DETAILED DESCRIPTION OF THE PREFERRED EMBODIMENTS

Figure 1:
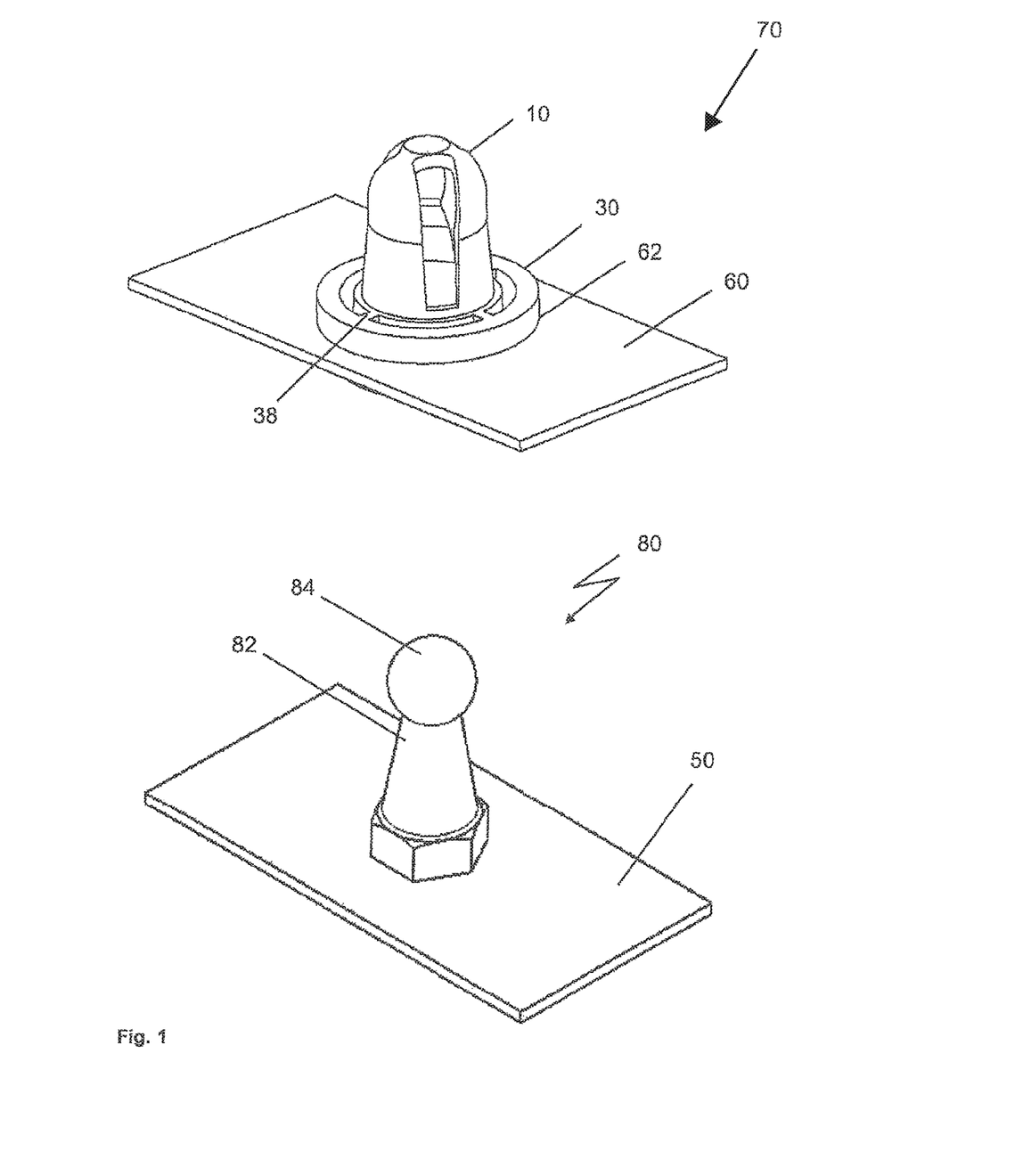
FIG. 1 a schematic representation of a plug-in coupling, installed in two components, comprising of a negative and a positive coupling part, FIG. 2 a perspective view of the negative coupling part according to a preferred embodiment, FIG. 3 a partial sectional view of the negative coupling part according to FIG. 2, FIG. 4 a view from below of the negative coupling part according to FIG. 2, FIG. 5 a partial section of the negative coupling part according to FIG. 2, FIG. 6 a further partial section of the negative coupling part according to FIG. 2, FIG. 7 a schematic representation of the plug-in coupling from FIG. 1 with positive coupling part partially inserted in the negative coupling part, preferably a pin having a ball head, and FIG. 8 a flow diagram of a production method of the negative coupling part of the present invention.
Figure 2:
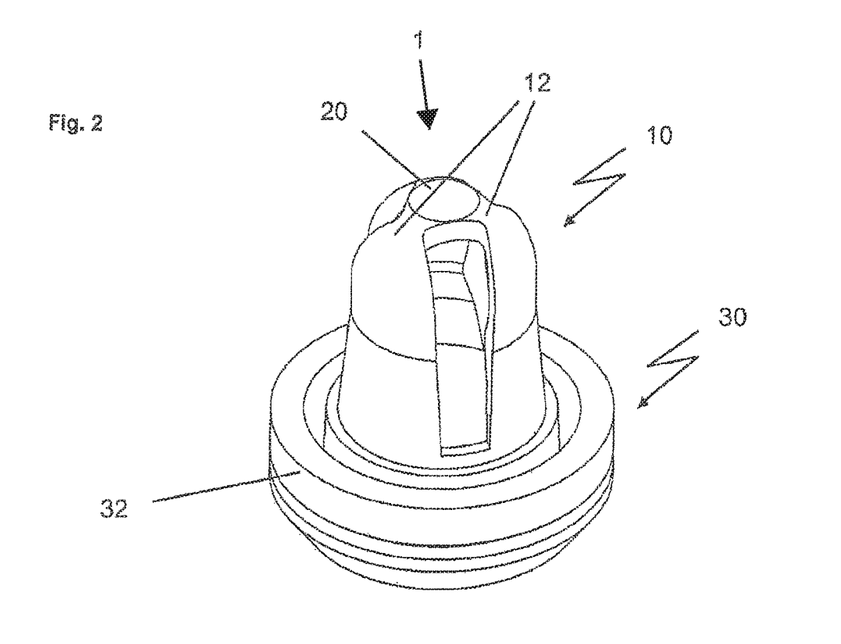
Figure 3:
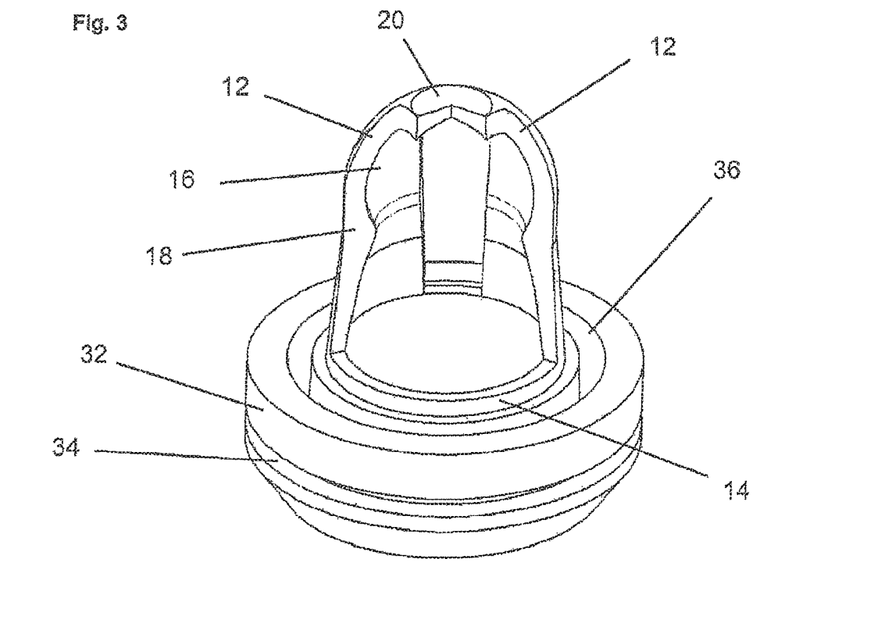

FIG. 1 shows a presently preferred embodiment of the plug-in coupling 70. The plug-in coupling 70 consists of a positive coupling part 80 that can be connected to a first component 50. The positive coupling part 80 preferably consists of a pin 82 having a ball head 84. Likewise, other head shapes are preferred, for instance a rectangular widening compared to the pin 82. This rectangular widening (not shown) also guarantees a latching connection to a negative coupling part 1, thus accommodating the head of the pin 82.

The plug-in coupling 70 also comprises the negative coupling part 1. It consists of a coupling construction 10 in which the positive coupling part 80 is detachably fastened.

According to one embodiment of the present invention, the coupling construction 10 comprises a ball socket, in which the ball head 84 of the above described pin 82 can be accommodated latching detachably. Other shapes, which are formed complementary to the above described positive coupling part 80, are also conceivable as a coupling construction 10. Some potentially advantageous properties of the plug-in coupling 70 are described in the following in an example of a pin 82 having a ball head 84 and a corresponding negative coupling part 1 having a ball socket 16.

The coupling construction 10 of the negative coupling part 1 can be fastened in an opening 62 of the component 60 via a retaining construction 30. The retaining construction 30 consists of a material which has a higher elasticity compared to the material of the coupling construction 10. Based on this, the material of the coupling construction 10, due to the lower elasticity thereof compared to the material of the retaining construction 30, guarantees a reliable coupling of the ball head 84 in the ball socket 16 of the coupling construction 10.

The coupling construction 10 preferably consists of a metal, a thermoplastic resin or an elastomer. Preferred materials for the coupling construction 10 are PA (polyamide), PP (polypropylene) and POM (polyoxymethylen (polyacetal)). Also conceivable are PET (polyethylene terephthalate), PBT (polybutylene terephthalate), ABS (acrylonitrile/butadiene/styrene graft copolymer), PC (polycarbonate), a mixture of PC and ABS or PE (polyethylene). The named materials are selected depending on the shape of the spring arms. The material of the coupling construction has an expansion of 3-70%, preferably 3-50% and further preferably 3-20%.

Figure 7:
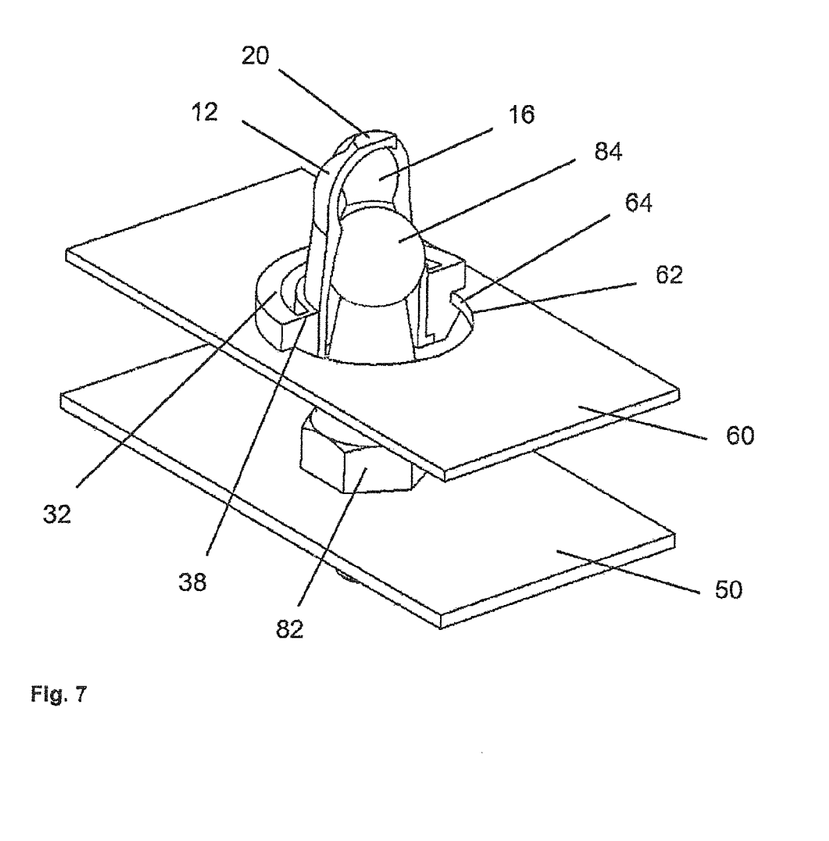
Figure 8:
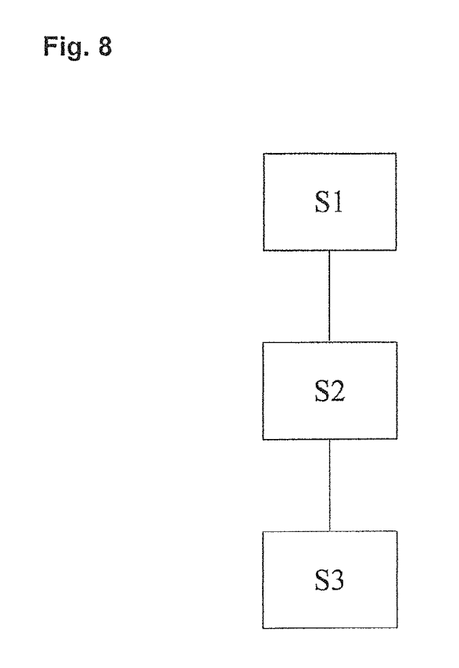

With the production of the negative coupling part 1, the coupling construction is produced from metal using known deformation methods. If the coupling construction 10 consists of plastic or an elastomer, the coupling construction 10 is injection molded in the mold described below (step S1 in FIG. 7). If the coupling construction 10 consists of plastic, according to a further embodiment, a metal insert is molded in the region of the ball socket 16, in particular insert molded or injection molded. In this manner, the shape of the ball socket 16 is defined and/or the later ball socket 16 is reinforced.

As seen in the FIG. 2-6, the coupling construction 10 comprises at least two spring arms 12 which extend in the axial direction of the plug-in coupling 70. The spring arms 12 due to the shape thereof and the material thereof are formed such that they can spring radially outward. The resilient moveability of the spring arms 12 can be adjusted via the length, the thickness and the width of the spring arms 12. The spring arms 12, at the radial interior thereof, due to the contour thereof, form the ball socket 16. The ball socket 16 has a circumferential undercut 18, so that the ball head 84 is held in a form-locking manner within the ball socket 16 by means of a retaining force that can be overcome.

According to an embodiment, not shown, the ball socket 16 comprises a second undercut distanced in the axial direction to the undercut 18, such that the ball head 84 is held, in the installed state, between the two undercuts.

According to another embodiment, the at least two spring arms 12 at their end 20 adjacent to the ball socket 16 are connected to each other. This connection at the end 20 stabilizes the spring arms 12 and guarantees a reliable retention of the ball head 84 in the ball socket 16.

In order to limit the spring movement of the spring arms 12, the spring arms 12 at their end facing away from the ball socket 16 are connected together via a retaining structure 14.

Figure 5:
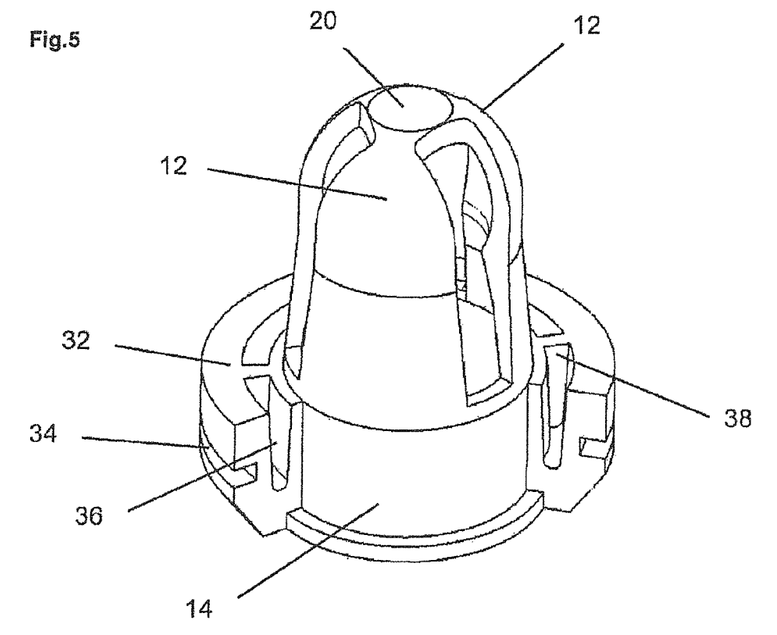
Figure 6:
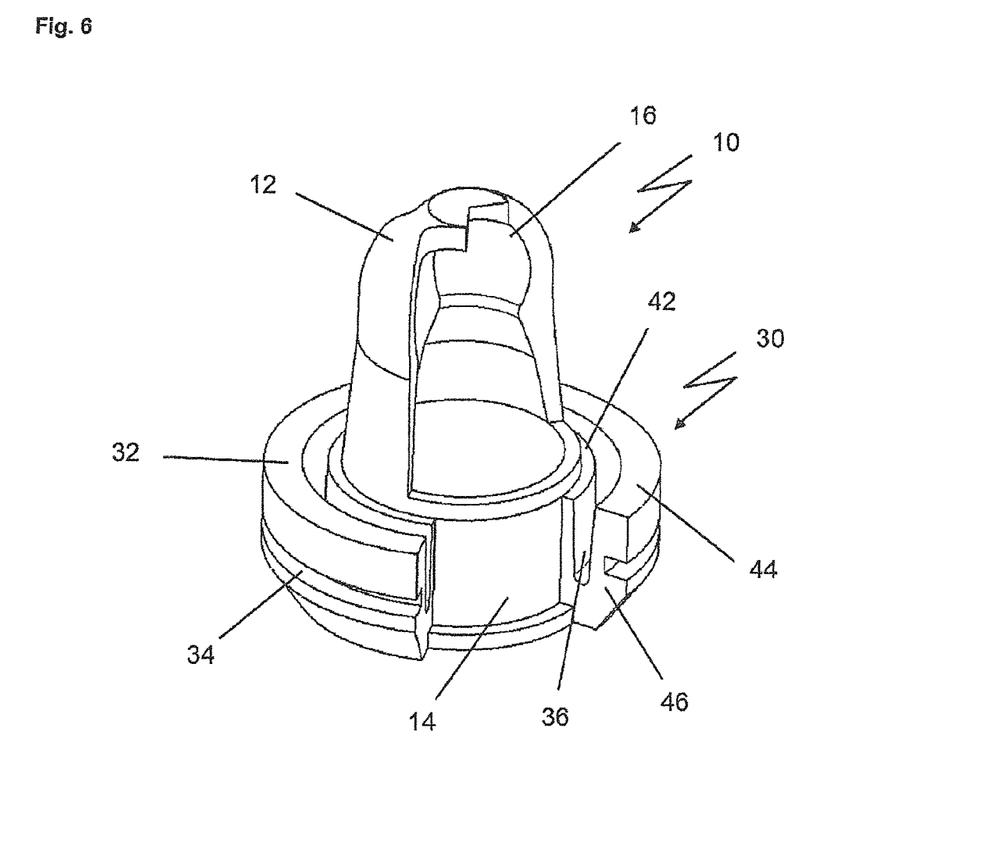

A further limiting of the moveability of the spring arms 12 occurs preferably via the connection of the spring arms 12 to each other at the ends thereof facing toward the ball socket 16, as described above. The retaining structure 14 preferably consists of individual connectible webs (not shown), which are disposed between adjacent spring arms 12. According to a further preferred embodiment, as shown in FIGS. 5 and 6, the retaining structure 14 is a circumferential ring which connects the spring arms 12 to each other. The circumferential retaining structure 14 comprises, according to a further embodiment, a circumferential recess lying radially outward, which is limited by two edges projecting circumferentially outward in the radial direction. This recess accommodates the retaining construction 30, as described below in more detail.

For later fastening of the negative coupling part 1 in the opening 62 of the component 60, the negative coupling part 1 comprises the retaining construction 30. The retaining construction 30 is a circumferential ring made of a material with higher elasticity compared to the material of the coupling construction 10. The retaining construction 30 is also produced from a thermoplastic resin or elastomer. The retaining construction 30 is disposed on the end of the coupling construction 10 facing away from the ball socket 16.

According to an embodiment, not shown, the spring arms 12 of the coupling construction 10 are not connected together via the retaining structure 14. Instead, the ends of the spring arms 12 facing away from the ball socket 16 are insert molded to the annular retaining construction 30 so that they are connected together stabilized via the retaining construction 30.

Figure 4:
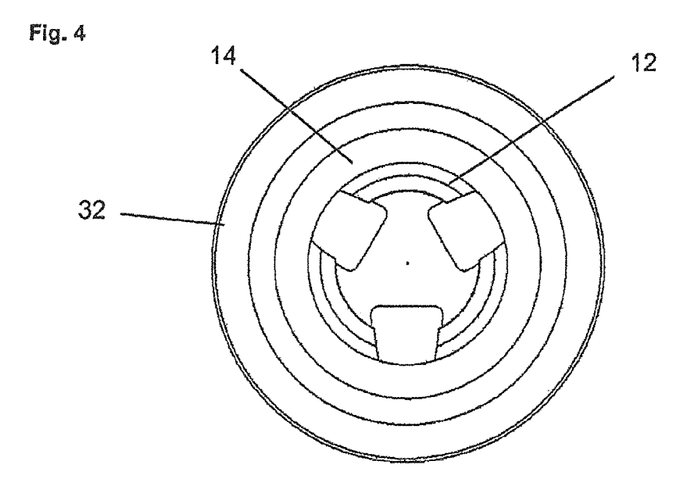

According to a further embodiment of the negative coupling part 1, the retaining structure 14, which may be implemented circumferentially, is insert molded to the annular retaining construction 30 (see FIGS. 4, 5 and 6). Because the annular retaining construction 30 is made of a material of higher elasticity than the material of the coupling construction 10, tolerances between the components 60, 70 can be compensated via the retaining construction 30. Additionally, the retaining construction 30 absorbs vibrations so that the retaining construction 30 and thus the negative coupling part 1 acts to decouple vibration and noises.

The retaining construction 30 preferably consists of TPE-V (olefin-based cross-linked thermoplastic elastomers), TPE-S (styrene block copolymers) or TPE-E (thermoplastic polyester elastomers/thermoplastic copolyester). In addition, in further applications, also TPE-O (olefin-based thermoplastic elastomers), TPE-A (thermoplastic copolyamide), TPE-U (urethane-based thermoplastic elastomers) or silicone can be used. The material of the retaining construction 30 has an expansion of nearly, or more than, 200%.

As seen in the sectional representations of FIGS. 5 and 6, the retaining construction 30 has a circumferential recess 34 that is radially open in the radial direction. The radial recess 34 accommodates the inner wall of the opening 62 of the component 60, when the negative coupling part 1 is installed therein. Due to the thickness of the retaining construction 30 in the radial direction and the elasticity of the material of the retaining construction 30, the retaining construction 30 can be compressed in the radial direction. This property of the retaining construction 30 may improve the absorption of vibrations of the components 50, 60 in the radial direction relative to the retaining construction 30, and the possibility of tolerance compensation between the components 50, 60.

The retaining construction 30 comprises a circumferential recess 36 axially open in the axial direction of the retaining construction 30, as is shown in FIGS. 5 and 6. Due to the axial recess 36, the retaining construction 30 consists of two concentric rings 42, 44 that are connected together via the circumferential web 46 (see FIG. 6). The web 46 extends in the radial direction relative to the retaining construction 30. Depending on the radial length and the axial thickness of the web 46, the concentric rings 42, 44 of the retaining construction 30 can be moved varyingly with respect to each other in the radial and axial direction. This movement between the concentric rings 42, 44 of the retaining construction 30 regulates preferably the tolerance compensation and the damping of vibrations and/or noises of the negative coupling part 1 and the entire plug-in coupling 70.

It is further possible to connect the concentric rings 42, 44 together via a plurality of reinforcing webs 38. The reinforcing webs 38 bridge the axial recess 36, as is shown in FIG. 5. In comparison to this, FIG. 6 shows the axial recess 36 without reinforcing webs 38. These reinforcing webs 38 are disposed at regular spacing within the axial recess 36.

The retaining construction 30, with the above-described constructive embodiments, is molded around, or respectively on, the annular retaining structure 14 (step S2), in order to form the negative coupling part 1. The retaining construction 30 and the retaining structure 14 are fastened in each other preferably via an integral bond. It is also preferable, although not mandatory, to provide one or two of the radially projecting edges of the retaining structure 14. On the one hand the radially projecting edge of the retaining structure 14 facing away from the ball socket 16 supports the demolding of the coupling construction 10 from the injection mold. On the other hand, the radially projecting edges of the retaining structure 14 each form an undercut in the axial direction for the retaining construction 30, so that the construction of the negative coupling part 1 is also stabilized.

REFERENCE LIST

1 negative coupling part
10 coupling construction
12 spring arm
14 retaining structure
16 ball socket
18 undercut
30 retaining construction
32 ring
34 radial recess
36 axial recess
50 first component
60 second component
62 opening
64 inside of the opening 62
70 plug-in coupling
80 positive coupling part
82 pin
84 ball head
S1 providing and injection molding
S2 insert molding
S3 providing

The invention claimed is:

1. A negative coupling part for a plug-in coupling, with which a first component and a second component can be detachably connected to each other, wherein the negative coupling part comprises:

[a.] a coupling construction including
a ball socket at a first end of the coupling construction, comprising at least two spring arms extending in an axial direction of the coupling construction and made of a first material for accommodating and detachably fastening a positive coupling part formed on the first component, wherein the at least two spring arms thereof are connected together at a second end of the coupling construction via a retaining structure; and
an annular retaining construction at the second end of the coupling construction, and made of a second material, which is a circumferential ring disposed on the second end of the coupling construction facing away from the ball socket, and which surrounds the second end of the coupling construction so that the negative coupling part is fastenable via said annular retaining construction in an opening of the second component,

[b.] wherein the second material has a higher elasticity than the first material, so that component vibrations can be absorbed by the annular retaining construction.

2. The negative coupling part according to claim 1, wherein the retaining structure is a circumferential retaining structure.

3. The negative coupling part according to claim 1, the at least two spring arms thereof being connected together at the first end.

4. The negative coupling part according to claim 1, the coupling construction thereof being made of a metal, a thermoplastic resin or a thermoplastic elastomer, which has a lower elasticity than the second material of the annular retaining construction.

5. The negative coupling part according to claim 1, the ring thereof having a circumferential recess radially open outward in the radial direction, in which an inside of the opening of the second component can be accommodated.

6. The negative coupling part according to claim 1, the annular retaining construction thereof having an axial recess circumferential about the annular retaining construction and open in the axial direction of the annular retaining construction, so that deformations of the annular retaining construction can be accommodated in the radial direction.

7. The negative coupling part according to claim 6, the axial recess thereof having a plurality of reinforcing webs bridging the axial recess.

8. The negative coupling part according to claim 1, the annular retaining construction thereof is made of a thermoplastic resin or an elastomer of higher elasticity than the coupling construction.

9. A plug-in coupling with which a first component and a second component are detachably connected together, and which comprises: a positive coupling part in connection with the first component, which is accommodated detachably and latching in a negative coupling part according to claim 1 in connection to the second component.

10. The plug-in coupling according to claim 9, wherein the positive coupling part comprises a pin having a ball head, wherein the annular retaining construction has one radial recess for fastening the negative coupling part to the second component and an axial recess for compensating vibration and tolerances.

11. A production method of a negative coupling part comprised of two materials of different elasticity, the method comprising the steps of:

[a.] providing a coupling construction made of a first material, and including a ball socket at a first end thereof, wherein the ball socket comprises at least two spring arms extending in an axial direction of the coupling construction and the at least two spring arms thereof are connected together at a second end of the coupling construction via a retaining structure, and

[b] injection-molding around the coupling construction generating an annular retaining construction that includes a circumferential ring disposed on the second end of the coupling construction facing away from the ball socket and made of a second material, which has a higher elasticity than the first material.

12. The production method according to claim 11, wherein the coupling construction is made of a thermoplastic resin or an elastomer and the annular retaining construction is made of a more elastic thermoplastic resin or elastomer.

13. The production method according to claim 11, further including the step of: providing an axial recess circumferential about the annular retaining construction and open in the axial direction of the annular retaining construction, and/or a radial recess at the annular retaining construction that is circumferential and radially open outward in the radial direction.

* * * * *